United States Patent
Yan et al.

(10) Patent No.: US 10,250,370 B2
(45) Date of Patent: Apr. 2, 2019

(54) FRAME STRUCTURE FOR A PHYSICAL CONTROL CHANNEL

(71) Applicant: Huawei Technologies Co., Ltd., Shenzhen (CN)

(72) Inventors: Min Yan, Shenzhen (CN); Yan Xin, Kanata (CA); Tao Wu, Shenzhen (CN); Sheng Sun, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 15/061,899

(22) Filed: Mar. 4, 2016

(65) Prior Publication Data

US 2017/0257193 A1    Sep. 7, 2017

(51) Int. Cl.
  *H04L 5/00*   (2006.01)
  *H04L 27/26*   (2006.01)
  *H04L 29/06*   (2006.01)
  *H04L 29/08*   (2006.01)
  *H04W 72/04*   (2009.01)

(52) U.S. Cl.
  CPC .......... *H04L 5/005* (2013.01); *H04L 27/2613* (2013.01); *H04L 29/0653* (2013.01); *H04L 67/147* (2013.01); *H04L 69/22* (2013.01); *H04W 72/042* (2013.01)

(58) Field of Classification Search
  CPC ................. H04L 5/005; H04L 29/0653; H04L 29/08621; H04L 49/9042; H04L 67/147; H04L 69/161; H04L 69/22; H04W 72/04; H04W 72/0406; H04W 72/042
  See application file for complete search history.

(56) References Cited

U.S. PATENT DOCUMENTS

| 8,238,316 B2 | 8/2012 | Stacey et al. |
| 8,265,096 B2 | 9/2012 | Zheng et al. |
| 2009/0092067 A1 | 4/2009 | Sudarshan et al. |

(Continued)

FOREIGN PATENT DOCUMENTS

| CN | 101374135 A | 2/2008 |
| CN | 102148661 A | 8/2011 |

(Continued)

OTHER PUBLICATIONS

"IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band," in IEEE Std 802.11ad-2012 (Amendment to IEEE Std 802.11-2012, as amended by IEEE Std 802.11ae-2012 and IEEE Std 802.11aa-2012), Dec. 28, 2012, pp. 1-628.

(Continued)

*Primary Examiner* — Eric Myers
(74) *Attorney, Agent, or Firm* — Slater Matsil, LLP

(57) ABSTRACT

A method of operating a serving point includes communicating a frame between the serving point and at least one station (STA), the frame including at least a first preamble and a second preamble, the first preamble including at least a first short training field (STF) and a legacy STF, the second preamble including at least a second STF, the legacy STF being orthogonal to the first STF and the second STF.

21 Claims, 8 Drawing Sheets

(56) References Cited

U.S. PATENT DOCUMENTS

| | | | |
|---|---|---|---|
| 2010/0142559 A1 | 6/2010 | Hu | |
| 2011/0051705 A1* | 3/2011 | Jones, IV | H04L 27/2613 |
| | | | 370/338 |
| 2011/0150148 A1 | 6/2011 | Son et al. | |
| 2011/0170627 A1 | 7/2011 | Kwon et al. | |
| 2011/0194545 A1 | 8/2011 | Yang et al. | |
| 2013/0301625 A1 | 11/2013 | Thoukydides et al. | |
| 2016/0105304 A1 | 4/2016 | Kwon | |
| 2016/0242205 A1 | 8/2016 | Chen et al. | |
| 2017/0078008 A1* | 3/2017 | Kasher | H04B 7/0617 |

FOREIGN PATENT DOCUMENTS

| | | |
|---|---|---|
| CN | 102714631 A | 10/2012 |
| CN | 102714643 A | 10/2012 |
| WO | 2011031454 A1 | 3/2011 |

OTHER PUBLICATIONS

Sun, R., et al., "TGay Use Cases," IEEE 802.11-2015/0625r3, Sep. 2015, 24 pages.

\* cited by examiner

FRAME STRUCTURE FOR A PHYSICAL CONTROL CHANNEL

TECHNICAL FIELD

The present invention relates generally to managing the allocation of resources in a network, and in particular embodiments, to techniques and mechanisms for a frame structure for a physical control channel.

BACKGROUND

Wireless signals communicated using carrier frequencies between 30 Gigahertz (GHz) and 300 GHz are commonly referred to as millimeter Wave (mmW) signals. There are a variety of telecommunication standards that define protocols for communicating mmW signals. One such example is Institute of Electrical and Electronics Engineers (IEEE) 802.11ad, which defines a protocol for communicating wireless signals over the 60 GigaHertz (GHz) frequency band. Due to the attenuation characteristics of wireless signals exceeding 30 GHz, mmW signals tend to exhibit high, oftentimes unacceptable, packet loss rates when transmitted over relatively long distances (e.g., distances exceeding one kilometer), and consequently have been primarily used for short-range communications. By way of example, IEEE 802.11ad is generally considered to have a coverage range of approximately ten meters.

SUMMARY OF THE INVENTION

Technical advantages are generally achieved by embodiments of this disclosure which describe a frame structure for a physical control channel.

In accordance with an embodiment, a method of operating an access point includes communicating a frame between the serving point and at least one station (STA), the frame including at least a first preamble and a second preamble, the first preamble including at least a legacy short training field (STF), the second preamble including at least a first STF, the legacy STF being orthogonal to the first STF.

In accordance with yet another embodiment, an apparatus includes a transmitter having a processor, and a non-transitory computer readable storage medium storing programming for execution by the processor, the programming including instructions to transmit at least a first frame including at least a first preamble and a second preamble, the first preamble including at least a legacy short training field (STF), the second preamble including at least a first STF, the legacy STF being orthogonal to the first STF.

BRIEF DESCRIPTION OF THE DRAWINGS

For a more complete understanding of the present disclosure, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
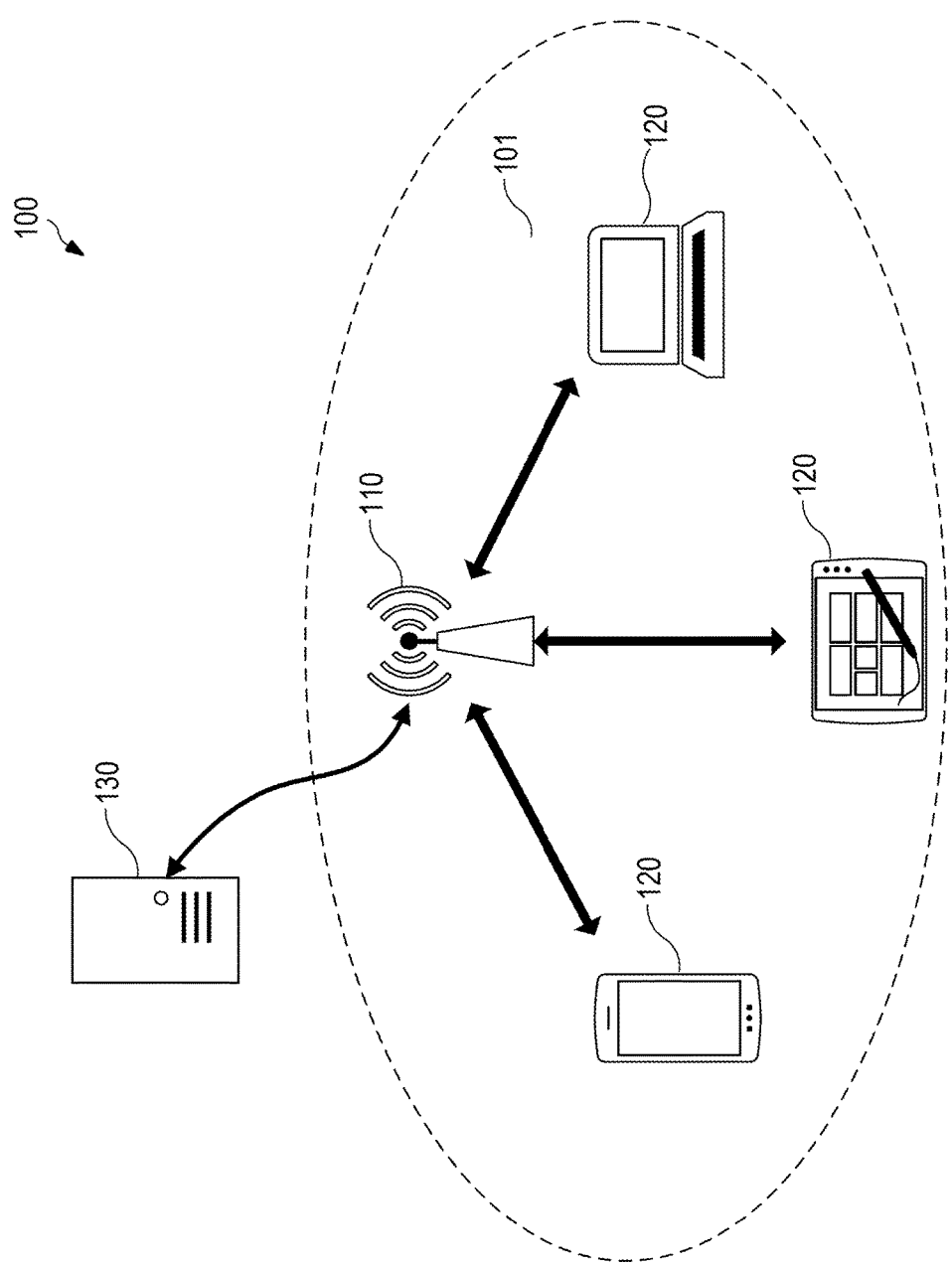
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. Although many of the disclosures provided herein are discussed in the context of wireless signals communicated using a carrier frequency in the 60 GHz band, it should be appreciated that the inventive aspects can be applied to any carrier frequency, including comparatively lower frequencies, such as a carrier frequency in the 2.5 GHz or the 5 GHz band. The inventive aspects can also be applied to carrier frequencies in excess of 60 GHz. The IEEE 802.11ad standard and other related standards use a type of signal called a control physical signal (control PHY). The control PHY is used to transmit control packets such as beacon frames and frames for beamforming in a low signal-to-noise ratio environment.

Embodiments provided herein may increase the range over which control PHY signals and other signals can be communicated by including a frame having multiple repeated groups of fields with particular configuration of the short training fields (STFs) within the field groups. In particular, including multiple STFs in a frame may allow the receiver to achieve improved automatic gain control (AGC) and synchronization, which may in turn increase the likelihood that the receiver will be able to successfully decode the frame's payload. In one embodiment, the first field group of the control PHY frame includes a legacy STF to allow for reception by legacy stations (STAs). The legacy STF is optionally preceded by an additional STF that is only detectable by next generation STAs. The legacy STF is followed by a legacy channel estimation (L-CE) field, a legacy header (L-Header) field and a data payload. Subsequent field groups in the frame include an STF that is only detectable by next generation STAs and, in a specific embodiment, is either equal in length to or different in length from the combined length of the legacy STF and the next generation STF in the first field group. The next generation STF in the last field group is followed by an L-CE field, an L-Header and a data payload. In another embodiment, the STFs in every field group have the same length, which simplifies processing of the STFs. Providing a legacy STF allows for backward compatibility and providing multiple next generation STFs increases the probability that a next generation STA will be able to perform automatic gain control (AGC) and to synchronize with the frame and thus accurately decode its contents. The legacy STF may have a format, sequence, or structure that is recognizable by stations (STAs) configured to communicate in accordance with IEEE 802.11ad, and each of the one or more next-generation STFs may have a format, sequence, or structure that is recognizable by STAs configured to communicate in accordance with IEEE 802.11ay, but is not recognizable by legacy STAs that are not configured to communicate in accordance with IEEE 802.11ay. By way of example, each of the one or more next-generation STFs may carry a sequence of symbols that is orthogonal to a sequence of symbols carried by the legacy STF. One sequence of symbols may be orthogonal to another sequence of symbols when there is zero cross-correlation between the respective sequences. By virtue of their orthogonality, the legacy STF may be detectable by legacy STAs that are not compatible with IEEE 802.11ay as well as by next-generation STAs that are compatible with IEEE 802.11ay. The next-generation STFs may be detectable by the next-generation STAs but go undetected by legacy STAs, which may be advantageous because legacy STAs may perceive an error if STFs having the same identifier are received in short succession. These and other details are described in greater detail below.

FIG. 1 is a diagram of a wireless communications network 100. The network 100 comprises an access point 110 having a coverage area 101, a plurality of stations (STAs) 120, which may be fixed or mobile, and a backhaul network 130. As shown, the access point 110 establishes uplink and/or downlink connections with STAs 120, which serve to communicate between the STAs 120 and access point 110. Data carried over the uplink/downlink connections may include data communicated between the STAs 120, as well as data communicated to/from a remote-end (not shown) by way of the backhaul network 130. As used herein, the term "access point" refers to any component (or collection of components) configured to provide wireless access to a network, such as an evolved NodeB (eNB), a macro-cell, a femtocell, a Wi-Fi access point (AP), or other wirelessly enabled devices. Access points may provide wireless access in accordance with one or more wireless communication protocols, e.g., long term evolution (LTE), LTE advanced (LTE-A), High Speed Packet Access (HSPA), Wi-Fi IEEE 802.11a/b/g/n/ac/ax/ad/ay, etc. As used herein, the term "mobile device" refers to any component (or collection of components) capable of establishing a wireless connection with a access point, such as a user equipment (UE), a mobile station (STA), and other wirelessly enabled devices. In some embodiments, the network 100 may comprise various other wireless devices, such as relays, low power nodes, etc.

Figure 2:
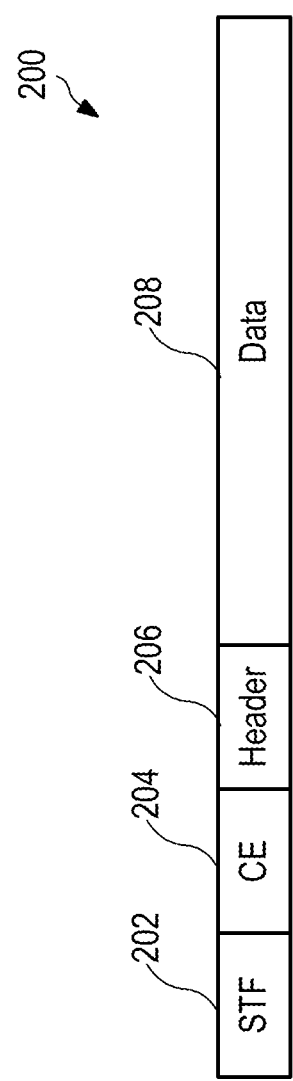
FIG. 2 is a diagram of control physical (PHY) frame structure for IEEE 802.11ad.

FIG. 2 is a diagram of a control PHY frame 200 that is used in IEEE 802.11ad. The frame 200 includes an STF 202, a channel estimation (CE) field 204, a header 206, and a payload 208. The preamble of the frame include the STF 202 and the CE field 204, which is used for packet detection, synchronization, automatic gain control (AGC), frequency offset estimation and channel estimation in IEEE 802.11ad. In particular, STAs use measurements obtained from signaling carried in the STF 202 for AGC and synchronization when decoding remaining portions of the frame, e.g., the CE field 204, the header 206, the payload 208, etc. AGC is a signaling processing technique that is used to account for fluctuations in a signal's amplitude, and may be particularly beneficial when decoding signals experiencing high path loss. Synchronization is a signal processing technique to provide accurate time and frequency reference in order to perform channel estimation using the CE field and detection of the header and payload. STAs use measurements obtained from signaling carried in the CE field 204 for channel estimation when decoding remaining portions of the frame, e.g., the header 206, the payload 208, etc. Channel estimation is another signaling processing technique that is used to account for signal distortion that occurs when a signal propagates over a channel. The header 206 carries control information (e.g., length of the data field, modulation and coding scheme (MCS) parameters, etc.) that is used to decode the payload 208. The payload 208 carries data.

Figure 3:
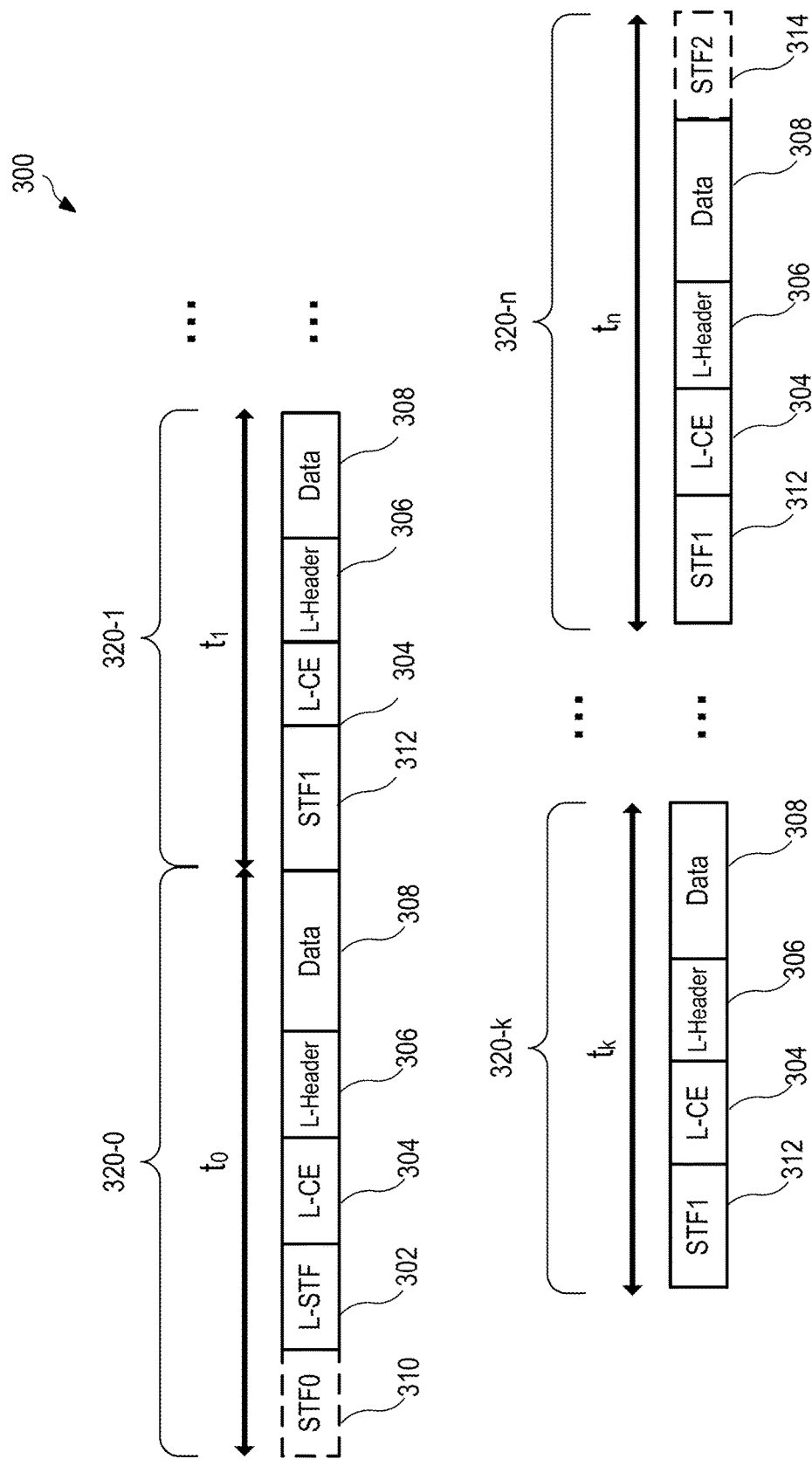
FIG. 3 is a diagram of an embodiment frame structure.

Embodiment frame configurations provided herein may be suitable for use with IEEE 802.11ay implementations. FIG. 3 is a diagram of a frame 300 that includes n+1 field groups 320-0 through 320-n, where n is an integer greater than or equal to 1. The first field group 320-0 includes optional STF0 310, legacy STF (L-STF) 302, legacy CE (L-CE) 304, legacy header (L-Header) 306 and payload 308. Subsequent field groups including the field groups 320-1 through 320-n. Each of these field groups includes STF1 312, L-CE 304, L-Header 306 and payload 308. STF0 310, L-STF 302 and L-CE 304 make up a preamble within field group 320-0. STF1 312 and L-CE 304 make up a preamble within each of field groups 320-1 to 320-n. Optionally, the last field group 320-n may also include STF2 314 at its end. The addition of STF2 314, in addition to helping with AGC and synchronization, as discussed above, may signal the end of the frame. STF2 314 may alternatively be a further repetition of STF1 312. The preamble of field group 320-0 in the frame 300 may be detectable by STAs configured to communicate in accordance with IEEE 802.11ad. This may allow the frame 300 to be backward compatible with IEEE 802.11ad so that the frame 300 can be decoded by legacy STAs as well as next-generation STAs. In one example, the L-STF 302, the L-CE 304, and the L-Header 306 are the same as the STF 202, the CE 204, and the header 206 (respectively) of the frame 200. The frame 300 may also carry fields that are detectable by STAs configured to communicate in accordance with IEEE 802.11ay. In some implementations, the fields configured in accordance with IEEE 802.11ay may go undetected, or otherwise be disregarded, by STAs that are not compatible with IEEE 802.11ay, such as legacy STAs. STF0 310 and STF1 312 are designed for use in "next generation" or subsequent generation frame structures. For example, L-STF 302 may be designed for used in IEEE 802.11ad and STF0 310 may be designed for use in IEEE 802.11ay. The terms "legacy" and "next generation" are used to indicate that STF0 310 and STF1 312 are directed to one communication protocol and L-STF 302 is directed to another communication protocol in order to allow for communication under either protocol. That is, the described embodiments of the invention allow for functionality using different protocols.

In frame 300, in the period of time $t_0$, the next generation IEEE 802.11ay STA sends a field group 302-0 in the format of an STF0 field 310 followed by a legacy 802.11ad control PHY frame (L-STF 302, L-CE 304, L-Header 306 and payload 308). Because field group 302-0 includes an entire legacy control PHY frame, frame 300 can be received and decoded by IEEE 802.11ad STAs. STF0 310 is added to improve synchronization under IEEE 802.11ay for example, for large spread delay scenarios, but will not be detected by IEEE 802.11ad STAs. Therefore, this embodiment is backward compatible.

STF0 310 must not interfere with synchronization by a legacy IEEE 802.11ad STA. In order to be backward compatible and to co-exist with legacy IEEE 802.11ad STAs, STF0 310 and STF2 314 are orthogonal with L-STF. "Orthogonal" as used herein means that there is zero cross correlation between two fields, such as between STF0 310 and L-STF 302. The orthogonality may be achieved, for example, by using a repeated component sequence for STF0 310 that is orthogonal to the component sequence repeated in L-STF302. This allows for backward compatibility with devices using IEEE 802.11ad because, upon receiving frame 300, a legacy STA using cross-correlation to detect L-STF will not detect STF0 310 or STF2 314. Thus, the legacy STA will simply ignore STF0 310 and STF2 314. On the other hand, a legacy STA will recognize L-STF 302 and thus it may be able to synchronize with frame 300. Similarly, STF1 312 can be generated by repeating a component sequence that is orthogonal to the component sequence of L-STF 302, and optionally orthogonal to STF0 310. In an embodiment, STF1 312 is equal in length to the combined length of L-STF 302 and STF0 310.

As noted above, the control PHY packet is used to provide service data, such as beacon frames and beamforming data. In frame 300 in a control PHY configuration, more than one of field groups 320-0 through 320-$n$ can include the same physical service data unit (PSDU) information. Providing the PSDU information repeatedly and sequentially improves control performance in situations of large path loss. In addition, a next generation STA, such as an IEEE 802.11ay STA, may be able to perform joint detection of multiple received L-CE, L-Header and Data fields, thus increasing the probability that the next generation STA can accurately detect the PSDU information. In addition, a next generation STA can use the STF0 and L-STF together or use a long size STF1 for synchronization in the scenarios of low SNR and large delay spread. In an embodiment, a subfield, e.g., length, in the L-Header 306, which is used to indicate the indicate the total length after L-Header in the first group field in IEEE 802.11ad, may instead be used to indicate the total length after L-Header 306 in the first frame, which is calculated based on the lengths of STF1 312, L-CE 304, L-Header 306 and data payload 308, and the number of group fields including STF1 312, L-CE 304, L-Header 306 and Data 308 subfields. A next generation STA, such as an IEEE 802.11ay capable STA, can then use this information in processing of channel estimation, header and data payload detection. This type of frame would only be addressed to next generation STAs, and thus would be ignored by legacy STAs based on the STA address detected from Data payload located in the first group field in the frame. Legacy STAs would not be active until the end of the frame since the legacy STAs know when the frame ends based on the Length subfield in L-Header 306 in the first group field.

In the embodiment of FIG. 3, the length of STF1 312 is equal to the length of STF0 310 and L-STF 302 combined. Because of this greater length as compared to L-STF 302 alone, the performance of STF1 is comparable to the performance combined STF0 310 and L-STF 302. If STF0 312 is not used, STF1 312 is preferably longer than L-STF 312. In addition, different versions of STF1 312 may be used. In a specific embodiment, all of the STF portions of every field group 320-0 through 320-$n$ have the same length. This configuration simplifies processing the STFs. In addition, the use of multiple STFs allows additional functionality. For example, STF0 310 and STF1 312 can be designed for use in auto-detection of 802.11ad and 802.11ay packets.

An additional advantage of the present embodiment is the use of multiple L-CE fields. With success of synchronization, a next generation STA, such as an IEEE 802.11ay STA, may be able to perform joint channel estimation by using more than one L-CE signal, thus increasing the accuracy of the channel estimation. However, legacy STAs, such as IEEE 802.11ad STAs, may only be able to use the first received L-CE signal to estimate the channel impulse response.

Figure 4:
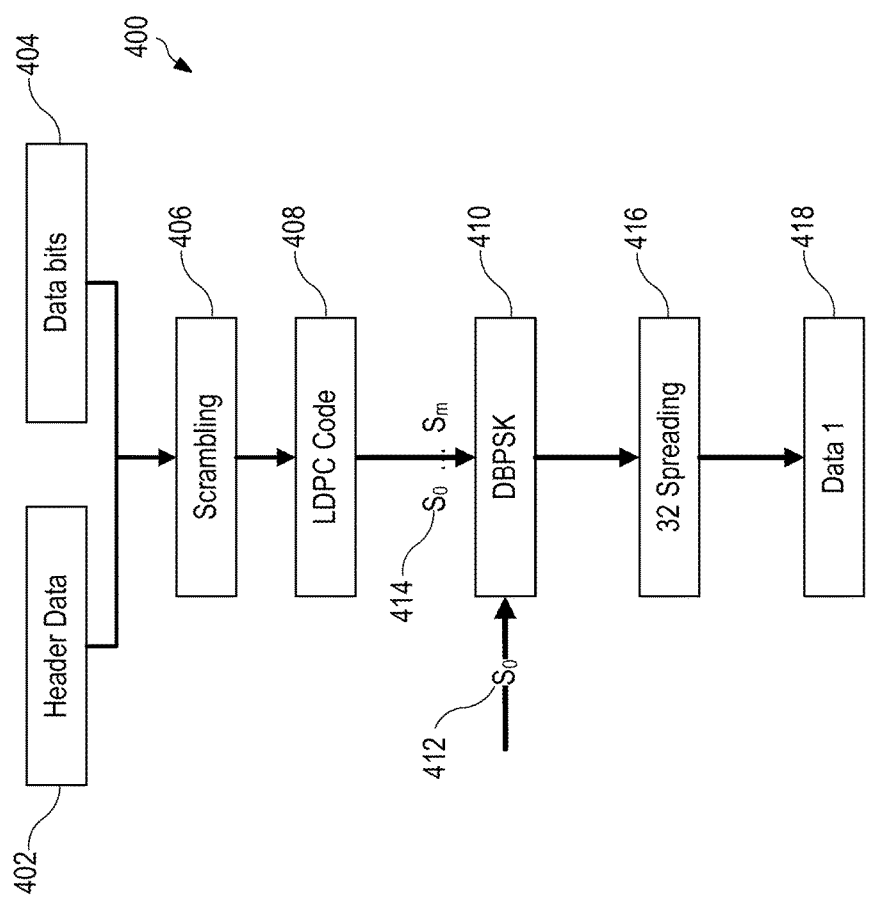
FIG. 4 is a diagram of a process of encoding header and data in an embodiment frame structure.

FIG. 4 is a flowchart of embodiment process 400 for encoding L-Header 306 and payload 308 of FIG. 3. The embodiment process 400 begins with header bits 402 and payload data bits 404, which are processed with a scrambling code in step 406. The scrambled bits are encoded for forward error correction (FEC) with low density parity check (LDPC) codes in step 408. The FEC encoded bits are modulated for differential binary phase-shift keying (DBPSK) in step 410 using a starting modulation symbol $S_0$ 412 and series of modulation symbols $S_0 \ldots S_m$ 414. The starting modulation symbol must begin coding using the first coded symbol $S_0$ for backward compatibility. In subsequent repetitions, the DBPSK modulation can begin with any of symbols $S_0$ through $S_m$. The DBPSK modulated constellations are spread using a 32 bit spreading code in step 416 and transmitted as an L-Header field 306 and a payload field 308 in step 418.

L-Header 306 and payload 308 may be encoded for each of field groups 320-0 through 320-$n$ using the same process, for example, process 400, or these fields may be encoded using multiple MCSs. As noted above, the frame 300 includes n+1 field groups 320-0 through 320-$n$. Each of these field groups includes an L-Header field 306 and a data payload 308. In one embodiment, in order to increase the probability of accurately decoding L-Header 306 and payload 308, these fields may be encoded using different MCSs in different field groups. As also noted above, path loss from interference, noise, etc. may have different effects on fields encoded and modulated using different processes. Using multiple processes to encode and/or modulate L-Header field 306 and payload 308 may increase the probability that one of these fields will be less affected by path loss issues, and thus make it more likely to be accurately decoded by the recipient. However, the MCS options for the L-Header field 306 are limited because, in the absence of additional coding in the STF or L-CE, the MCS of the L-Header field must be known a priori by the STA. The multiple MCSs may be used in an alternating manner, i.e. changing processes for every field group, or may be used in any configuration, i.e. a number of field groups using one process followed by a number field groups using another process in any combination. For example, DBPSK encoding of different field groups may use a different starting symbol $S_j$, where j is an integer greater than zero.

Figure 5:
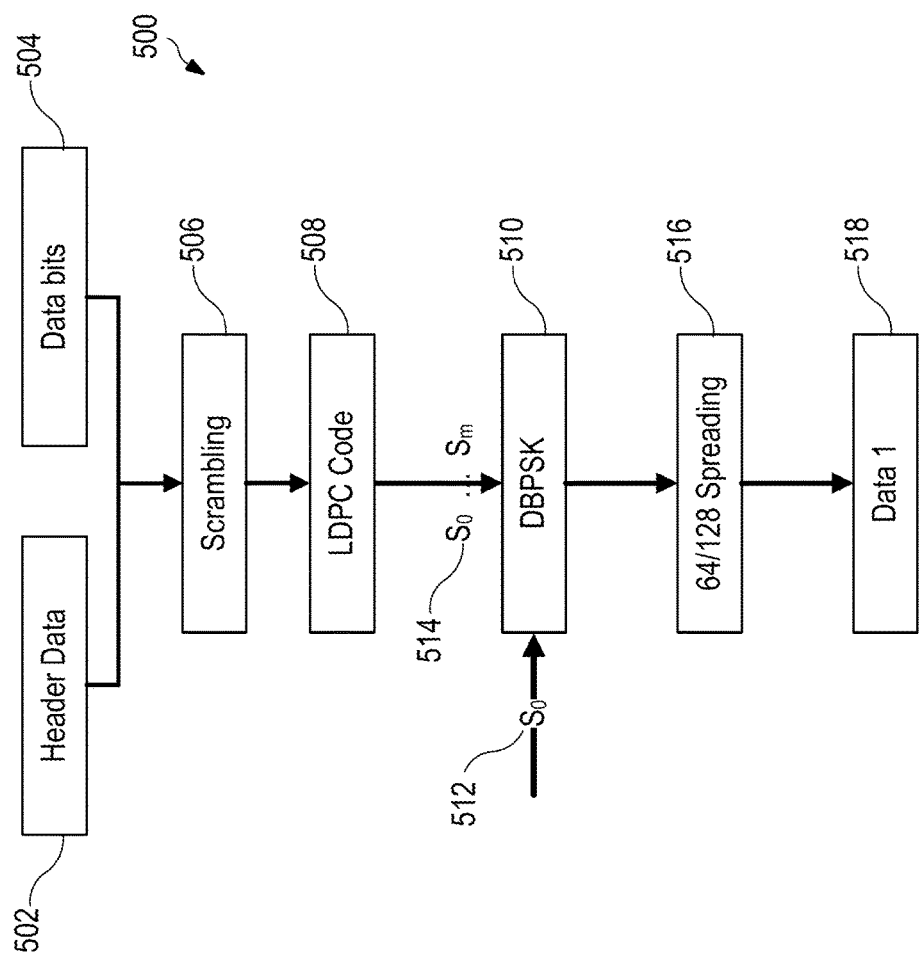
FIG. 5 is a diagram of another process of encoding header and data in an embodiment frame structure.

FIG. 5 is a flowchart of additional embodiment process 500 for encoding L-Header 306 and payload 308 of FIG. 3. The embodiment process 500 begins with either header data 502 or payload data bits 504, which are processed with a scrambling code in step 506, encoded for forward error correction (FEC) with low density parity check (LDPC) codes in step 508, encoded for differential binary phase-shift keying (DBPSK) in step 610 using a starting modulation symbol $S_0$ 512 and series of modulation symbols $S_0 \ldots S_m$ 514, which are then spread using a 64/128 bit spreading code in step 516 and provided as either an L-Header 306 or a payload fields in step 518. As with process 400, the starting modulation symbol must begin coding using the first coded symbol $S_0$ for backward compatibility. In subsequent repetitions, the DBPSK modulation can begin with any of symbols $S_0$ through $S_m$ from any symbol in the stream. L-Header 306 and payloads 308 may all be encoded using the same MCS, for example, process 500, or may be encoded using multiple MCSs, for example, using processes 500 and 400. The multiple processes may be used in an alternating manner, i.e. changing processes for every frame, or may be used in any configuration, i.e. a number i frames using one process followed by 1 frames using another process, where i and 1 are integers. As described above, the use of differing processes increases the chance of accurate reception of the header and the data. As noted above, the MCS options for the L-Header field 306 are limited because, in the absence of additional coding in the STF or L-CE, the MCS of the L-Header field must be known a priori by the STA.

Figure 6:
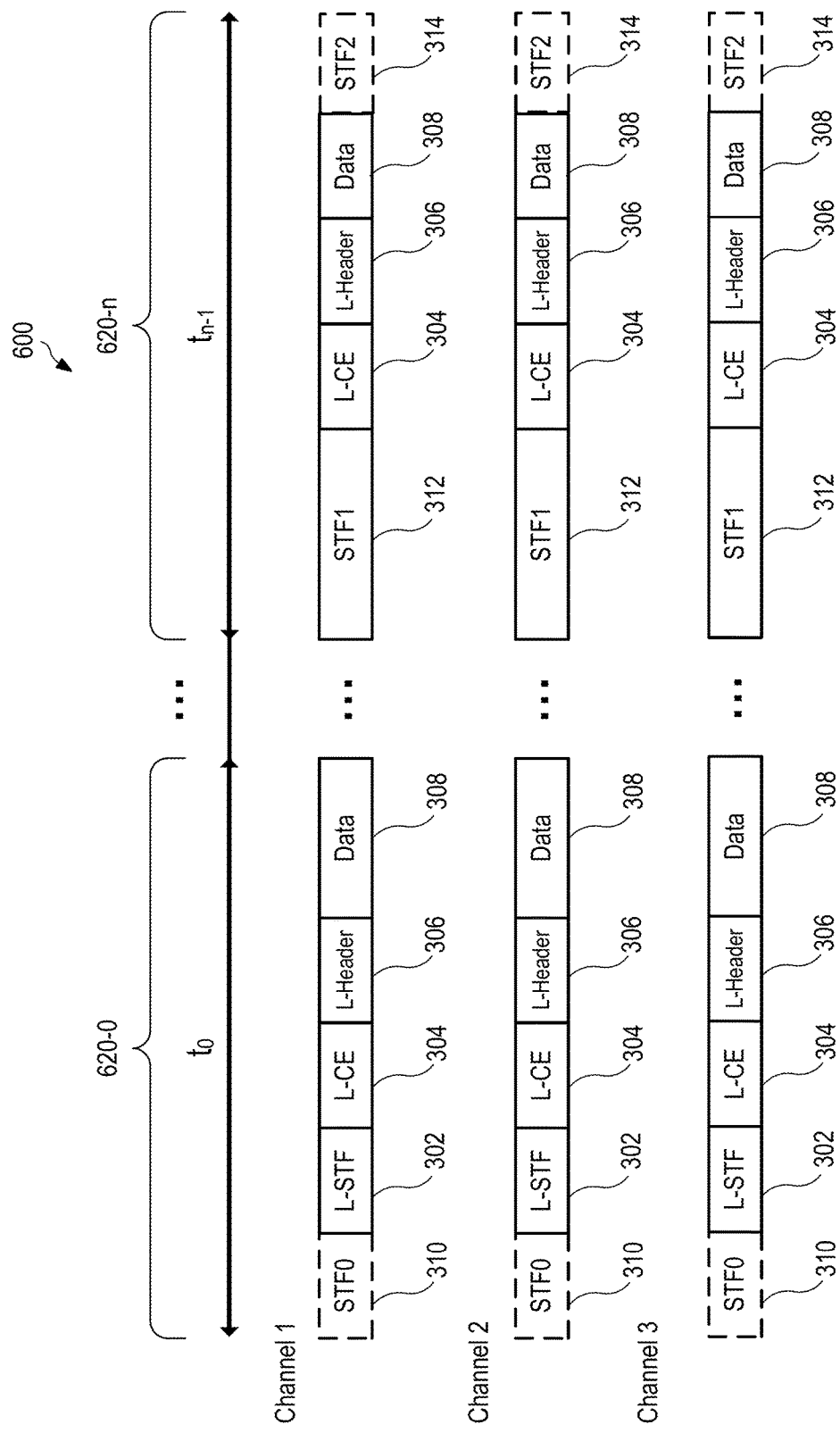
FIG. 6 is a diagram of another embodiment frame structure.

FIG. 6 is a diagram of frame 600, which is another embodiment frame structure for use in another embodiment of the present invention. Frame 600 is transmitted over three channels, with n+1 field groups 620-0 through 620-n. For each channel, the first field group 620-0 includes the fields STF0 310, L-STF 302, L-CE 304, L-Header 306 and payload 308. Subsequent field groups include the fields STF1 312, L-CE 304, L-Header 306 and payload 308 as shown in field group 620-n. The data in payloads 308 for each channel may be the same as each other, to provide for redundancy, or different, to provide greater throughput. As with frame 300 of FIG. 3, the last field group 620-n in each channel may optional end with an STF2 314.

Figure 7:
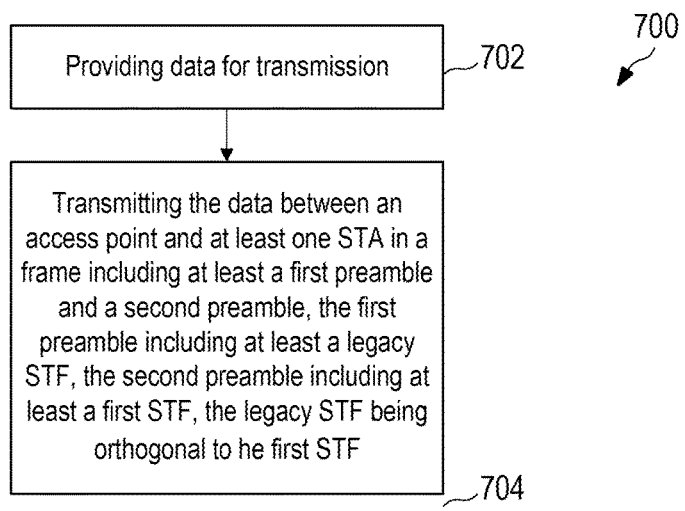
FIG. 7 is flowchart of an embodiment method.

FIG. 7 is a flowchart of an embodiment method 700. Method 700 is a process for transmitting a frame, and includes the step 702 of providing data for transmission. Step 704 includes transmitting the data between an access point and an STA in a frame including at least a first preamble and a second preamble, the first preamble including at least a legacy STF, the second preamble including at least a first STF, the legacy STF being orthogonal to the first STF. The frame may be in any of the formats described with regard to FIGS. 3-6. Method 700 is a process for transmitting data and may be performed by an access point, such as access point 110 or by an STA such as one of STAs 120.

Figure 8:
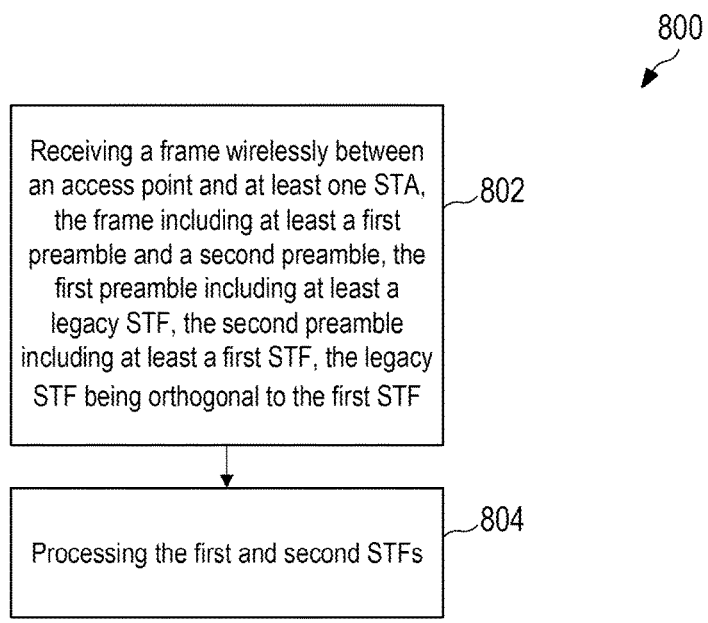
FIG. 8 is a flowchart of another embodiment method.

FIG. 8 is a flowchart of an embodiment method 800. Method 800 is a method for receiving a frame, and include a step 802 of receiving a frame wirelessly between an access point and at least one STA, the frame including at least a first preamble and a second preamble, the first preamble including at least a legacy STF, the second preamble including at least a first STF, the legacy STF being orthogonal to the first STF. The frame may be in any of the formats described with regard to FIGS. 3-6. In step 804, the receiving device processes the first and second STFs to, for example, synchronize the sending and receiving devices. Method 800 is an embodiment process for receiving transmitted data. Method 800 may be performed by an access point, such as access point 110 or by a STA such as one of STAs 120.

Figure 9:
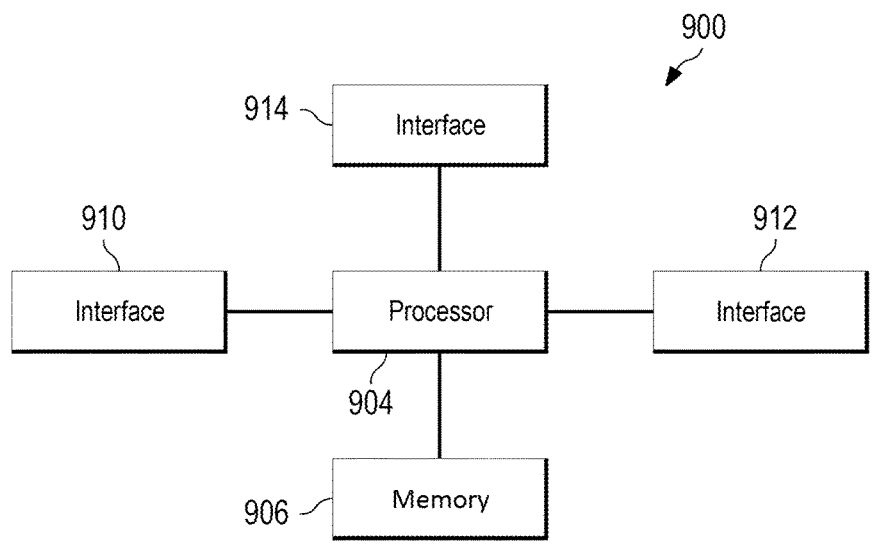
FIG. 9 is a diagram of an embodiment processing system.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as access point 110, STAs 120, a user equipment (UE), a personal computer (PC), a tablet, a wearable communications device (e.g., a smartwatch, etc.), or any other device adapted to access a telecommunications network.

Figure 10:
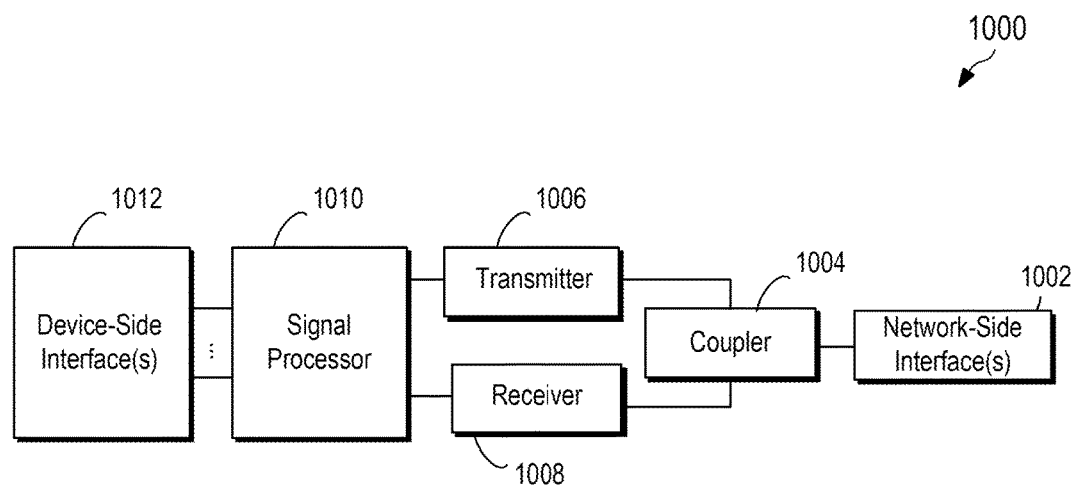
FIG. 10 is a diagram of an embodiment transceiver.

In some embodiments, one or more of the interfaces 910, 912, 914 connects the processing system 900 to a transceiver adapted to transmit and receive signaling over the telecommunications network, such as network 100. FIG. 10 illustrates a block diagram of a transceiver 1000 adapted to transmit and receive signaling over a telecommunications network. The transceiver 1000 may be installed in a host device, such as access point 110, STAs 120. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for operating an access point comprising: communicating a frame between the access point and at least one station (STA), the frame including at least a first preamble, a first payload, a second preamble, and a second payload, the first preamble including at least a legacy short training field (STF), the second preamble including at least a first STF, the legacy STF being orthogonal to the first STF.

2. The method of claim 1 wherein the first preamble further includes a second STF and the second STF is orthogonal to the legacy STF.

3. The method of claim 1 wherein the frame includes a plurality of additional preambles.

4. The method of claim 1 further including a second STF at the end of the frame.

5. The method of claim 1, wherein the first STF is used by the one or more next-generation STAs to enhance an automatic gain control derived from the first STF.

6. The method of claim 1, wherein a duration of the first STF is equal to a sum of a duration of a second STF and a duration of the legacy STF.

7. The method of claim 1, wherein a sequence of symbols carried in the first STF is identical to a sequence of symbols carried in the second STF.

8. The method of claim 1, wherein a sequence of symbols carried in the first STF is different than a sequence of symbols carried in the second STF.

9. The method of claim 1, wherein the first preamble further includes a first instance of a legacy channel estimation (CE) field, and the second preamble further includes a second instance of the legacy CE field, a sequence of symbols in the first instance of the legacy CE field being identical to a sequence of symbols in the second instance of the legacy CE field.

10. The method of claim 9, wherein the first instance of the legacy CE field in the first preamble is used for channel estimation by one or more legacy STAs and one or more next-generation STAs, and wherein the second instance of the legacy CE in the second preamble field is used for channel estimation by the one or more next-generation STAs without being used for channel estimation by the one or more legacy STAs.

11. The method of claim 9, wherein the first instance of the legacy header field in the first preamble is transmitted with a different modulation coding scheme (MCS) than the second instance of the legacy header field in the second preamble.

12. The method of claim 1, wherein the first preamble directly precedes the first payload, and wherein the second preamble directly precedes the second payload, the first payload carrying the same data as the second payload.

13. The method of claim 1, wherein the first preamble further comprises a second STF, a first instance of a legacy CE field, and a first instance of a legacy header, and wherein the second preamble further comprises a third STF, a second instance of the legacy CE field, and a second instance of the legacy header.

14. An apparatus comprising:
a transmitter having a processor; and
a non-transitory computer readable storage medium storing programming for execution by the processor, the programming including instructions to:
transmit at least a first frame including:
at least a first preamble, a first payload, a second preamble, and a second payload, the first preamble including at least a legacy short training field (STF), the second preamble including at least a first STF, the legacy STF being orthogonal to the first STF.

15. The apparatus of claim 14, wherein the first preamble further includes a first instance of a legacy channel estimation (CE) field, and the second preamble further includes a second instance of the legacy CE field, a sequence of symbols in the first instance of the legacy CE field being identical to a sequence of symbols in the second instance of the legacy CE field.

16. The apparatus of claim 14, wherein the first preamble further includes a first instance of a legacy header field, and the second preamble further includes a second instance of the legacy header field, the first instance of the legacy header field carrying the same control information as the second instance of the legacy header field.

17. The apparatus of claim 14, wherein the first preamble directly precedes the first payload, and wherein the second preamble directly precedes the second payload, the first payload carrying the same data as the second the payload.

18. The apparatus of claim 14, wherein the apparatus comprises an access point.

19. The apparatus of claim 14, wherein the apparatus comprises a STA.

20. The apparatus of claim 14 wherein the first preamble further includes a second STF and the second STF is orthogonal to the legacy STF.

21. The apparatus of claim 14 further including a second STF at the end of the frame.

\* \* \* \* \*